United States Patent
Hoffmann

(10) Patent No.: US 11,350,266 B2
(45) Date of Patent: May 31, 2022

(54) SESSION MANAGEMENT FUNCTION SELECTION IN HOME MOBILE COMMUNICATIONS NETWORK

(71) Applicant: NOKIA SOLUTIONS AND NETWORKS OY, Espoo (FI)

(72) Inventor: Klaus Hoffmann, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/768,850

(22) PCT Filed: Dec. 4, 2017

(86) PCT No.: PCT/EP2017/081339
§ 371 (c)(1),
(2) Date: Jun. 1, 2020

(87) PCT Pub. No.: WO2019/110081
PCT Pub. Date: Jun. 13, 2019

(65) Prior Publication Data
US 2021/0243587 A1     Aug. 5, 2021

(51) Int. Cl.
*H04W 8/06* (2009.01)
*H04W 36/00* (2009.01)
*H04W 76/10* (2018.01)

(52) U.S. Cl.
CPC ............. *H04W 8/06* (2013.01); *H04W 76/10* (2018.02)

(58) Field of Classification Search
CPC ....... H04W 8/06; H04W 76/10; H04W 76/02; H04W 36/00; H04W 8/00
See application file for complete search history.

(56) References Cited

U.S. PATENT DOCUMENTS

| | | | |
|---|---|---|---|
| 10,827,397 B2 * | 11/2020 | Wang | H04W 8/14 |
| 2019/0053010 A1 * | 2/2019 | Edge | H04W 64/00 |
| 2019/0090123 A1 * | 3/2019 | Abraham | H04L 69/04 |
| 2020/0015158 A1 * | 1/2020 | So | H04W 60/00 |
| 2020/0053636 A1 * | 2/2020 | Mas Rosique | H04W 48/18 |
| 2020/0252813 A1 * | 8/2020 | Li | G06Q 20/382 |
| 2020/0267781 A1 * | 8/2020 | Lee | H04W 76/27 |
| 2021/0185741 A1 * | 6/2021 | Lee | H04W 36/00 |

OTHER PUBLICATIONS

International Search Report and Written Opinion dated Jun. 25, 2018 corresponding to International Patent Application No. PCT/EP2017/081339.

(Continued)

*Primary Examiner* — Khawar Iqbal
(74) *Attorney, Agent, or Firm* — Squire Patton Boggs (US) LLP

(57) ABSTRACT

Upon receiving (S10) a request in a visited network in which a UE is roaming, an SMF selection function (10) of the visited network selects an H-SMF located in a home network of the UE by transmitting (S20) information indicating requirements towards an H-NRF (20) located in the home network, receiving (S40), based on the transmission of the information, at least one candidate H-SMF complying with the requirements, and selecting (S50) the H-SMF from the at least one candidate H-SMF.

13 Claims, 2 Drawing Sheets

(56) References Cited

OTHER PUBLICATIONS

Nokia Alcatel Lucent Shanghai Bell Sprint T Mobile USA NEC: "Network Slice Instance selection," 3GPP Draft S2-174538, San Jose del Cabo, Mexico, Jun. 20, 2017, XP051309593.
Huawei et al: "Ol#3 TS 23.502: Slicing support in Registration with AMF re-allocation and PDU Session establishment procedures," 3GPP Draft; S2-177372, Ljubljana, Slovenia, Oct. 22, 2017, XP051349528.
3rd Generation Partnership Project; Technical Specification Group Services and System Aspects; Procedures for the 5G System; Stage 2 (Release 15), 3GPP Draft; 23502-130_RM, Nov. 14, 2017, XP051379265.
Ericsson (Rapporteur): "Editorial corrections and alignment," 3GPP Draft; S2-179097_WAS8860_23502-Editorial, Reno, Nevada, Nov. 30, 2017, XP051365786.
Huawei et al.: "SMF selection in roaming case," 3GPP Draft; S2-174542 TS 23.502 SMF Selection in Roaming Case, San Jose del Cabo, Mexico, Jun. 25, 2017, XP051303387.
Communication pursuant to Article 94(3) EPC dated Jul. 26, 2021 corresponding to European Patent Application No. 17811269 4.

\* cited by examiner

SESSION MANAGEMENT FUNCTION SELECTION IN HOME MOBILE COMMUNICATIONS NETWORK

BACKGROUND OF THE INVENTION

Field of the Invention

The present invention relates to SMF selection in a home mobile communications network, e.g. a H-PLMN. In particular, the present invention refers to an SMF selection process in "home-routed roaming" case in future 5G networks.

Related Background Art

Network slicing is a mechanism of 5G networks. A network slice is a logical network comprising a core network, which provides telecommunication services and network capabilities which may vary from slice to slice.

A device may provide NSSAI parameters to the network to help it select a core network part of a slice instance for the device. A single NSSAI may lead to the selection of several slices in the sense that possibly e.g. a V-PLMN may select its slice on its own and an H-PLMN also on its own.

A PDU session is a 5G concept for an association between the device and a data network. The device associates an application with one of a plurality of parallel PDU sessions, each PDU session corresponding to one core network slice, where it is possible that several PDU sessions are part of one slice.

Common to all or several slices is an AMF. Besides this shared function, different slices may also have dedicated control plane functions such as an SMF, which manages PDU sessions. User plane functions are dedicated to each slice.

The following meanings for the abbreviations used in this specification apply:
4G Fourth Generation
5G Fifth Generation
AMF Access and mobility Management Function
CCNF Common Control Network Function
H-NRF Home NRF
H-SMF Home SMF
QoS Quality of Service
MANO Management & Orchestration
NF Network Function
NFV NF Virtualization
NG Next Generation
NSI Network Slice Instance
NSSAI Network Slice Selection Assistance Information
NRF Network Repository Function
RAN Radio Access Network
SMF Session Management Function
S-NSSAI Single NSSAI
UE User Equipment
V-NRF Visited NRF
V-SMF Visited SMF

SUMMARY OF THE INVENTION

According to current standard, selection of an SMF in a home-routed roaming case not only involves selecting a (V-)SMF in a visited network (e.g. V-PLMN), but also an (H-)SMF in a home network (e.g. H-PLMN). The present invention proposes mechanisms how this H-SMF can actually be selected.

Generally, selecting an SMF is performed by an "SMF selection function" which can be, in an embodiment of the invention, part of an AMF.

Currently, it is proposed that during SMF selection the following factors may be considered: selected data network name (DNN), NSSAI (Network Slice Selection Assistance Information) and/or S-NSSAI (Single Network Slice Selection Assistance Information), subscription information from UDM (e.g. whether local breakout may apply to the session), local operator policies, load conditions of candidate SMFs.

The present invention proposes different processes how selection of the SMF in a UE's home network can be handled for the home-routed roaming case (i.e. in case the UE is roaming in a visited network).

These processes are defined by the methods, apparatuses and computer-readable storage medium as defined in the appended claims.

According to at least some embodiments of the invention, a problem of error prone mapping of NSSAIs or S-NSSAIs between VPLMN and HPLMN is overcome by relying on QoS information to select slices and NFs.

In the following the invention will be described by way of embodiments thereof with reference to the accompanying drawings.

DESCRIPTION OF THE EMBODIMENTS

Figure 1:
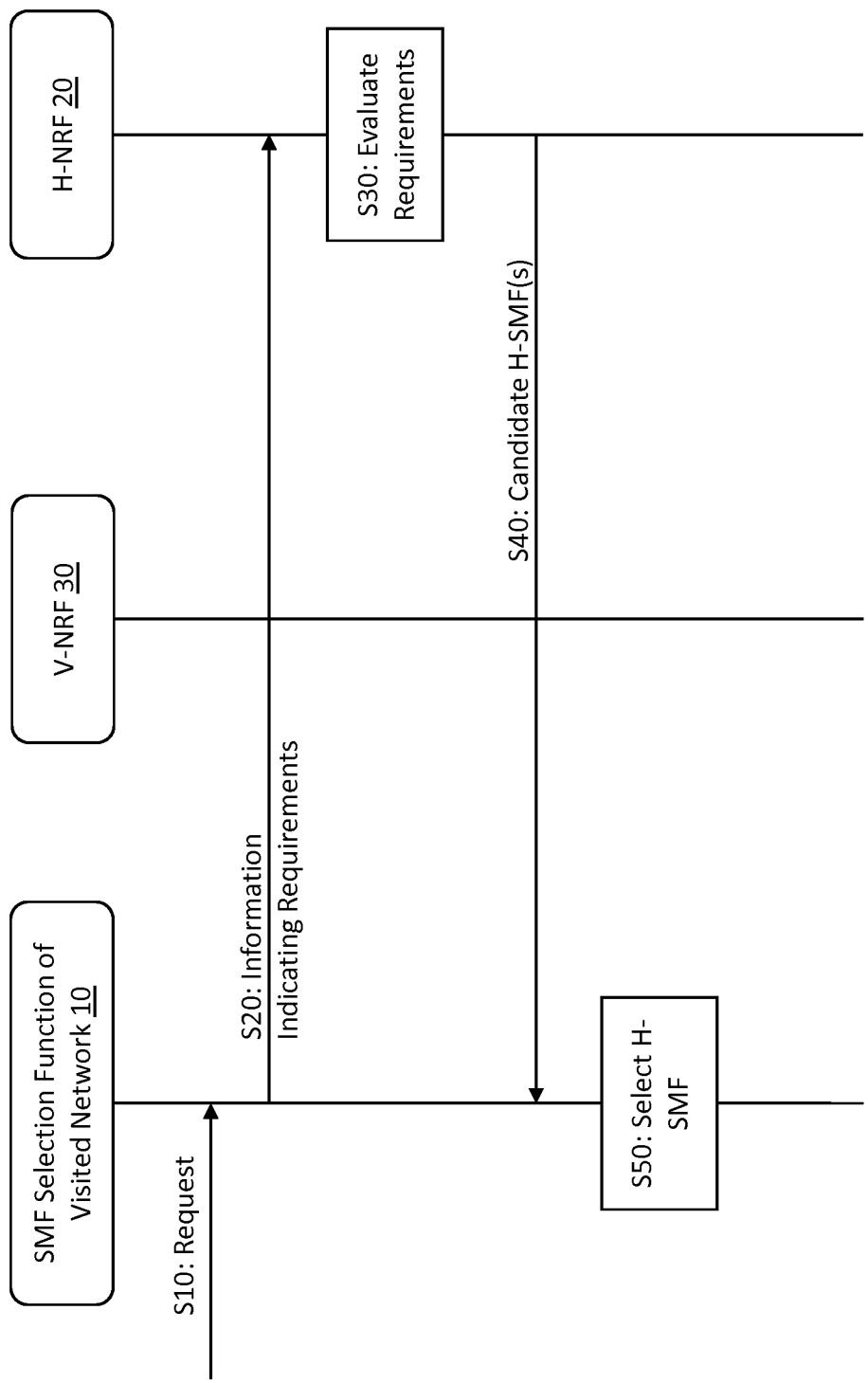
FIG. 1 shows a signaling diagram illustrating processes according to at least some embodiments of the invention.

As mentioned above, the present invention proposes different processes how selection of an SMF in a UE's home network can be handled for a home-routed roaming case (i.e. in case the UE is roaming in a visited network).

According to 5G networks, the UE's home network (e.g. H-PLMN) and the visited network (e.g. V-PLMN) in which the UE is roaming may each comprise multiple network slices or network slice instances (NSI). These may be identified via e.g. an S-NSSAI. An S-NSSAI, in turn, may be comprised of a Slice/Service type (SST), which refers to the expected network slice behavior in terms of features and services and a Slice Differentiator (SD) which is optional information that complements the SSTs to differentiate amongst multiple network slices of the same SST. Standardized SSTs can be, for example: eMBB (enhanced Mobile Broadband), eMBB (enhanced Mobile Broadband) or MIoT (massive IoT).

More generally, an NSSAI is seen as a collection of multiple S-NSSAIs. Currently, it is foreseen that there can be at most 8 S-NSSAIs in an NSSAI that may be e.g. transmitted in signaling messages between a UE and a network. Each S-NSSAI may assists the network in selecting a particular network slice for a UE or a service. Further, the same network slice may be selected by means of different S-NSSAIs.

As a specific service (e.g. for one UE) may be placed into a certain network slice in the V-PLMN as well as the H-PLMN, according to at least some embodiments of the invention explained in options 1 to 3 below, a "mapping table" is proposed to be introduced. Generally, an S-NSSAI can have standard values or network-specific values. Particularly when network-specific values are used, said mapping table may be used to map e.g. an S-NSSAI of the V-PLMN to an S-NSSAI of the H-PLMN. This mapping table may be located in a selecting AMF, a network repository function (NRF) of the visited network, or an NRF of the home network.

To be more precise, a selecting AMF, i.e. V-AMF located in the visited network, is to select an H-SMF. The to-be-selected H-SMF has to be part of the "same" network slice as the V-AMF. However, as V-PLMN and H-PLMN maintain their own network slices independently from each other, at some point during the selection process, according to the options 1 to 3 which will be described in more detail below, a mapping from network slices of the V-PLMN to the network slices of the H-PLMN is performed to find the network slice (of the to-be-selected H-SMF) in the H-PLMN corresponding to the network slice (of the V-AMF) in the V-PLMN.

According to option 1, in the selection process, the AMF of the visited network, which is in charge of the visited network slice providing the specific service to the UE maps the visited S-NSSAI (or NSSAI) to the S-NSSAI (or NSSAI, respectively) of the H-PLMN and sends an NRF query request to the V-NRF, which forwards the request to the H-NRF in the H-PLMN. Based on the S-NSSAI (or NSSAI), the H-NRF returns a candidate list of H-SMFs to the AMF.

According to option 2, in the selection process, the AMF of the visited network, which is in charge of the visited network slice providing the specific service to the UE sends the visited S-NSSAI (or NSSAI) of the V-PLMN to the V-NRF of the V-PLMN, and the V-NRF maps the visited S-NSSAI (or NSSAI) to the S-NSSAI (or NSSAI, respectively) of the H-PLMN and sends an NRF query request to the H-NRF of the H-PLMN. Based on the S-NSSAI (or NSSAI), the H-NRF returns a candidate list of H-SMFs to the AMF.

According to option 3, the AMF of the visited network, which is in charge of the visited network slice providing the specific service to the UE sends the visited S-NSSAI (or NSSAI) of the V-PLMN to the V-NRF of the V-PLMN, which sends an NRF query request to the H-NRF of the H-PLMN. The H-NRF maps the visited S-NSSAI (or NSSAI) to the S-NSSAI (or NSSAI, respectively) of the H-PLMN. Based on the S-NSSAI (or NSSAI) the H-NRF returns a candidate list of H-SMFs to the AMF.

However, noting that the above options require additional administration of a mapping table at the AMF of the V-PLMN, at the V-NRF of the V-PLMN or at the H-NRF of the H-PLMN, according to at least some embodiments of the invention which will be described in more detail in option 4 below, it is suggested to send information indicating requirements (e.g. service information such as QoS information) from an SMF selection function (e.g. provided by the AMF) towards the H-NRF e.g. via the V-NRF. The information indicating requirements may be provided by the UE, or may be simulated (e.g. by the network) in case the UE does not provide this information. The requirements may be explicit QoS requirements and/or may comprise at least one of bandwidth, jitter, delay, packet loss, maximum latency, etc., as required with respect to the specific service.

According to option 4, the H-NRF, instead of evaluating the H-S-NSSAI (or H-NSSAI), as done in options 1 to 3, evaluates the requirements indicated by the information (e.g. maximum latency, packet loss, bandwidth, jitter, delay, etc.) to return a list of candidate SMFs via the V-NRF to the AMF such that the SMF selection function at the V-PLMN will be able to select the SMF of the H-PLMN.

Advantageously, according to option 4 there is no need to forward or transmit V-S-NSSAI (or V-NSSAI) related information, or to map the V-NSSAI (or V-NSSAI) to the H-NSSAI (or the H-NSSAI, respectively). On the other hand, according to certain embodiments, information indicating the requirements could also be derived from the V-S-NSSAI (or V-NSSAI), for example at the H-NRF. In this case, V-S-NSSAI (or V-NSSAI) related information has to be forwarded obviously.

Generally, according to option 4, specific (QoS) information will be transmitted from the selecting V-AMF (via the V-NRF) to the H-NRF. Then the H-NRF (pre-) selects specific H-SMFs that are available and fulfill the (QoS) requirements and returns a list with these candidate H-SMFs. From this list the V-AMF will finally select an H-SMF. According to at least one embodiment of the invention, the H-NRF selects the H-SMF, e.g. by returning only one H-SMF.

FIG. 1 shows a signaling diagram illustrating signaling between an SMF selection function 10 of a visited network in which a UE is roaming, an H-NRF 20 of a home network of the UE, which performs routing, and optionally a V-NRF 30 of the visited network, according to at least some embodiments of option 4 of the present invention.

In S10, the SMF selection function 10 receives a request, e.g. a request for a new packet data unit session.

Thereupon, in S20, the SMF selection function 10 transmits information indicating requirements (e.g. service information such as QoS information) towards the H-NRF 20. According to an implementation example of the invention, the SMF selection function 10 transmits the information directly to the H-NRF 20. According to an another implementation example of the invention, the SMF selection function 10 transmits the information to the V-NRF 30 which forwards the information to the H-NRF 20.

As mentioned above, the request received in S10 may be a request for a new packet data unit session. In 5G, such request is called "PDU Session Establishment request". There also may be other events which may trigger an SMF selection process, i.e. cause the SMF selection function 10 to advance to S20. Such events may comprise an "N2 Path Switch request", for example, which is triggered by a handover of the UE from a source eNB (4G)/NG RAN (5G) to a target eNB (4G)/NG RAN (5G). This may happen in case the new target eNB (4G)/NG RAN (5G) is not in charge of the "old" SMF and therefor the corresponding SMF needs to be re-selected.

In S30, the H-NRF 20 receives the information and evaluates the requirements indicated in the information, e.g. maximum latency, packet loss, bandwidth, jitter, delay, etc.

In S40, the H-NRF 20 returns at least one candidate H-SMF (e.g. a list comprising H-SMF(s)), complying with the requirements, to the SMF selection function 10, e.g. via the V-NRF 30.

In S50, the SMF selection function 10 receives the at least one candidate H-SMF complying with the requirements from the H-NRF 20 e.g. via the V-NRF 30, and selects the H-SMF from the at least one candidate H-SMF.

An advantage associated with option 4 is that expensive and error prone administration of S-NSSAI (or NSSAI) mapping for each service for each roaming partner can be avoided.

According to at least some embodiments of the invention, the H-NRF 20 is discovered by the V-NRF 30 as will be described below.

Generally, an NRF is a special case of an NF, because the V-NRF is maintaining the NFs of the V-PLMN, and the H-NRF maintains the NFs of the H-PLMN.

To make the V-NRF 30 aware of the H-NRF 20 of the H-PLMN, according to an implementation example of the invention it is suggested that the H-NRFs of each H-PLMN and the V-NRFs of each V-PLMN register with each other.

According to an alternative implementation example of the present invention, OAM/MANO systems of roaming partners exchange instantiation and addresses of their NRF such that each V-NRF automatically knows its counterpart H-NRF at the H-PLMN via configuration. For example, it is suggested that an OAM/MANO function of the PLMNs and between the PLMNs provide/exchange and configure the existence and the addresses of the NRF of the partner PLMN:

PLMN ID1, NRF IDx, FQDN X/IP address A
PLMN ID2, NRF IDy, FQDN Y/IP address B
etc.

Figure 2:
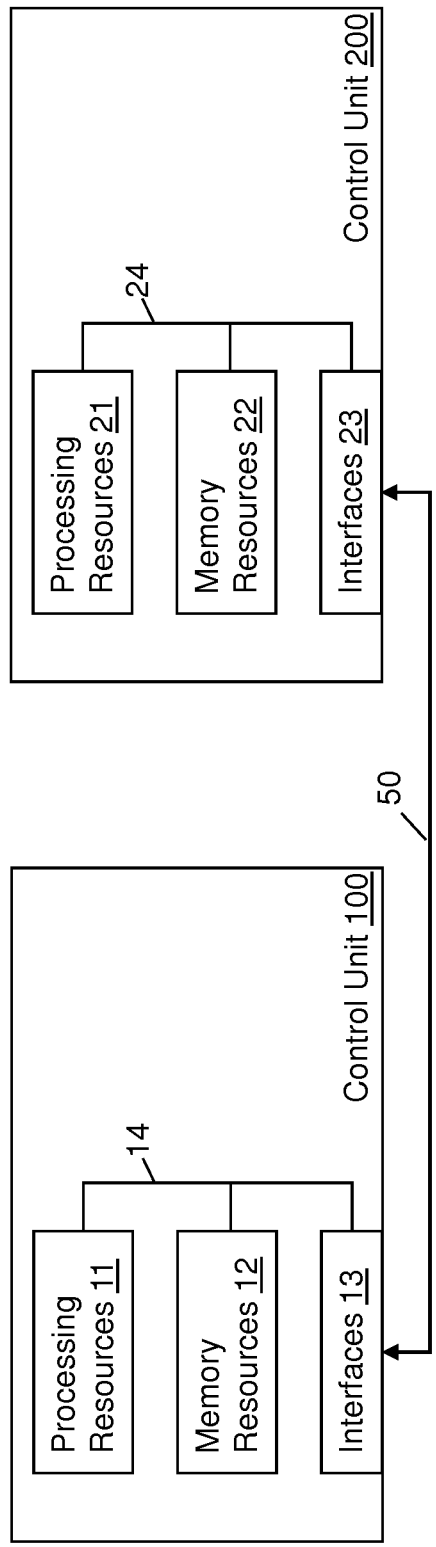
FIG. 2 shows a schematic block diagram illustrating a configuration of control units in which examples of embodiments of the invention are implementable.

Now reference is made to FIG. 2 which shows a schematic block diagram illustrating a configuration of control units 100, 200, in which examples of embodiments of the invention are implementable.

The control unit 100 may be part of and/or used by the SMF selection function 10 shown in FIG. 1.

The control unit 100 comprises processing resources (processing circuitry) 11, memory resources (memory circuitry) 12 which may store a program, and interfaces (interface circuitry) 13, which are coupled by a connection 14.

The control unit 200 may be part of and/or used by the H-NRF 20 shown in FIG. 1.

The control unit 200 comprises processing resources (processing circuitry) 21, memory resources (memory circuitry) 22, which may store a program, and interfaces (interface circuitry) 23, which are coupled by a connection 24.

The control units 100 and 200 are coupled via a connection 50.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The programs stored in the memory resources 12, 22 are assumed to include instructions that, when executed by the dedicated processing resources 11, 21, cause the respective control unit to operate in accordance with the exemplary embodiments of this invention, as detailed above.

In general, the exemplary embodiments of this invention may be implemented by computer software stored in the memory resources 12, 22 and executable by the processing resources 11, 21, or by hardware, or by a combination of software and/or firmware and hardware in any or all of the devices shown.

The memory resources 12, 22 may be of any type suitable to the local technical environment and may be implemented using any suitable data storage technology, such as semiconductor based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi core processor architecture, as non limiting examples.

Further, as used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to an aspect of the present invention, an apparatus is provided that, according to an implementation example of the invention, comprises and/or uses the control unit 100 shown in FIG. 2.

The apparatus comprises means for, upon receiving a request in a visited network in which a user equipment is roaming, performing selection of a home session management function, H-SMF, located in a home network of the user equipment. The means for performing selection comprises transmitting means for transmitting information indicating requirements towards a home network repository function, H-NRF, located in the home network, receiving means for receiving, based on the transmission of the information, at least one candidate H-SMF complying with the requirements, and selecting means for selecting the H-SMF from the at least one candidate H-SMF.

According to at least some embodiments of the invention, the means for performing selection comprises a function located in the visited network.

According to an implementation example of the invention, the means for performing selection comprises a visited access and mobility management function, V-AMF, located in the visited network.

According to at least some embodiments of the invention, the request comprises a request for a new packet data unit session.

According to at least some embodiments of the invention, the information comprises service information.

According to at least some embodiments of the invention, the transmitting means transmits the information towards the H-NRF via a visited network repository function, V-NRF, located in the visited network.

According to an implementation example of the invention, the transmitting means, the receiving means and the selecting means are implemented by the processing resources 11, the memory resources 12 and the interfaces 13 of the control unit 100.

According to another aspect of the present invention, an apparatus is provided that, according to an implementation example of the invention, comprises and/or uses the control unit 200 shown in FIG. 2.

The apparatus comprises evaluating means for, upon receiving information indicating requirements from a visited network in which a user equipment is roaming, evaluating the requirements by a home network repository function, H-NRF, located in a home network of the user equipment, and returning means for returning at least one candidate home session management function, H-SMF, complying with the requirements.

According to an implementation example of the invention, the evaluating means and the returning means are implemented by the processing resources 21, the memory resources 22 and the interfaces 23 of the control unit 200.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
   upon receiving, in a visited network in which a user equipment is roaming, a request for a packet data unit session for a service placed in a network slice of the visited network, performing selection of a home session management function, H-SMF, located in a home network of the user equipment,
   wherein the selection comprises:
   mapping identifiers of network slices of the visited network to identifiers of network slices of the home network to find a network slice in the home network corresponding to the network slice in the visited network that the service is placed in;
   transmitting an identifier of the network slice in the home network corresponding to the network slice in the visited network that the service is placed in and information indicating requirements towards a home network repository function, H-NRF, located in the home network;
   based on the transmission of the identifier of the network slice in the home network corresponding to the network slice in the visited network that the service is placed in and the information indicating requirements, receiving at least one candidate H-SMF complying with the requirements; and
   selecting the H-SMF from the at least one candidate H-SMF.

2. The method of claim 1, wherein the selection is performed by a function located in the visited network.

3. The method of claim 1, wherein the selection is performed by a visited access and mobility management function, V-AMF, located in the visited network.

4. The method of claim 1, wherein the request comprises a request for a new packet data unit session.

5. The method of claim 1, wherein the information comprises service information.

6. The method of claim 1, wherein the information is transmitted towards the H-NRF via a visited network repository function, V-NRF, located in the visited network.

7. A non-transitory computer-readable medium storing a program comprising software code portions which cause a processing device to perform the method of claim 1 when the program is run on the processing device.

8. An apparatus, comprising:
   at least one processor; and
   at least one memory including computer program code;
   the at least one memory and the computer program code configured to, with the at least one processor, cause the apparatus at least to perform:
   upon receiving, in a visited network in which a user equipment is roaming, a request for a packet data unit session for a service placed in a network slice of the visited network, performing selection of a home session management function, H-SMF, located in a home network of the user equipment,
   wherein the selection comprises:
   mapping identifiers of network slices of the visited network to identifiers of network slices of the home network to find a network slice in the home network corresponding to the network slice in the visited network that the service is placed in;
   transmitting an identifier of the network slice in the home network corresponding to the network slice in the visited network that the service is placed in and information indicating requirements towards a home network repository function, H-NRF, located in the home network;
   based on the transmission of the identifier of the network slice in the home network corresponding to the network slice in the visited network that the service is placed in and the information indicating requirements, receiving at least one candidate H-SMF complying with the requirements; and
   selecting the H-SMF from the at least one candidate H-SMF.

9. The apparatus of claim 8, wherein the at least one memory and the computer program code are configured to, with the at least one processor, cause the apparatus to perform the selection by a function located in the visited network.

10. The apparatus of claim 8, wherein the at least one memory and the computer program code are configured to, with the at least one processor, cause the apparatus to perform the selection by a visited access and mobility management function, V-AMF, located in the visited network.

11. The apparatus of claim 8, wherein the request comprises a request for a new packet data unit session.

12. The apparatus of claim 8, wherein the information comprises service information.

13. The apparatus of claim 8, wherein the at least one memory and the computer program code are configured to, with the at least one processor, cause the apparatus to transmit the information towards the H-NRF via a visited network repository function, V-NRF, located in the visited network.

* * * * *